A. FOX.
FILTER.
No. 67,281.  Patented July 30, 1867.
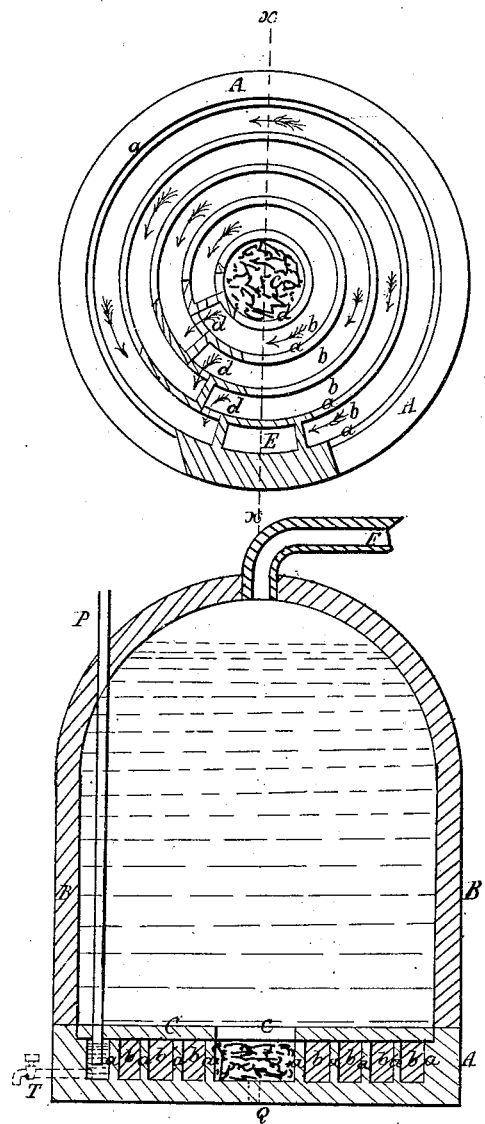
Witnesses
Theo Trische
J. A. Service
Inventor
Alexander Fox

United States Patent Office

ALCANDER FOX, OF POUGHKEEPSIE, NEW YORK.

Letters Patent No. 67,281, dated July 30, 1867

IMPROVEMENT IN FILTERS.

The Schedule referred to in these Letters Patent and making part of the same.

TO ALL WHOM IT MAY CONCERN:

Be it known that I, ALCANDER FOX, of Poughkeepsie, in the county of Dutchess, and State of New York, have invented a new and improved Filter for Cisterns and other purposes; and I do hereby declare that the following is a full, clear, and exact description thereof, which will enable others skilled in the art to make and use the same, reference being had to the accompanying drawings, forming part of this specification.

This invention relates to an improvement in filters for cisterns and other purposes, and consists in a divided box fitting into the bottom of the cistern or other reservoir, the said box being furnished with a lid or cover having a hole, through which the liquid to be filtered passes into the first compartment of the divided box. This and all the other compartments, save one, are filled with divers purifiers, as charcoal, sand, gravel, and the like, through which the liquid passes in succession until it reaches the delivery compartment, whence it is pumped or drawn for use. The filter can be cleaned by merely reversing the stream and allowing the liquid to flow out from the first compartment by an outlet or tap provided for the purpose. In the accompanying drawings—

Figure 1 is a top view or plan of my improved filter, with the cover removed and portions of the divisions broken away to exhibit the channels for the liquid in filtration.

Figure 2 is a section thereof at line $x$ $x$, with a cistern or other reservoir superposed.

A A is the outer wall of the filter; B, fig. 2, the wall of the cistern or reservoir superposed (in the drawing) upon the filter, which thus forms a bottom to the cistern, but it will be found more convenient in practice to fit the filter to the bottom of and inside the cistern or reservoir, which, and consequently the filter which fits it, may be of any desired shape. C is the cover of the cistern fitting closely upon the walls $a$ $a$ $a$, which separate the compartments $b$ $b$ $b$, so that none of the liquid in filtration may pass over the walls. At D in the wall of each compartment, and at its base, is a hole, through which the liquid in filtration passes from one compartment and through one filtering bed into the next. A small compartment, E, is cut off from the last of the $b$ compartments, into which the liquid flows by the perforated wall $e$. Each compartment, except E, is filled with some purifying or filtering material, such as sponge, charcoal, sand, gravel, or the like. The water or other liquid flows from the cistern or reservoir supplied from the feed F into the first compartment of the filter through a hole, $c$, in the cover C, and filters through the matter in the first compartment, and flows through the hole $d$ into the next, and so through the matter in each compartment in succession, in the direction of the arrows, until it reaches the compartment E, whence it is drawn by a tap, T, in the wall of the filter, or by a pump, pumping it up through a pipe, P. To cleanse the filter a tap, Q, in the bottom of the first compartment is opened, and the stream is thus caused to flow in the reversed direction until it flows perfectly pure through Q. I do not confine my improvement to use in connection with cisterns, as it may be employed in all the various forms, sizes, and purposes to which filters are ordinarily adapted.

Having thus described my invention, what I claim as new, and desire to secure by Letters Patent, is—

The combination of a series of labyrinthine filtering compartments, substantially as herein specified and described.

The above specification of my invention signed by me this 27th day of March, 1867.

ALCANDER FOX.

Witnesses:
WM. F. McNAMARA,
ALEX. F. ROBERTS.